March 15, 1927.  B. P. CURRIER  1,621,352
MEASURING INSTRUMENT
Filed April 10, 1922
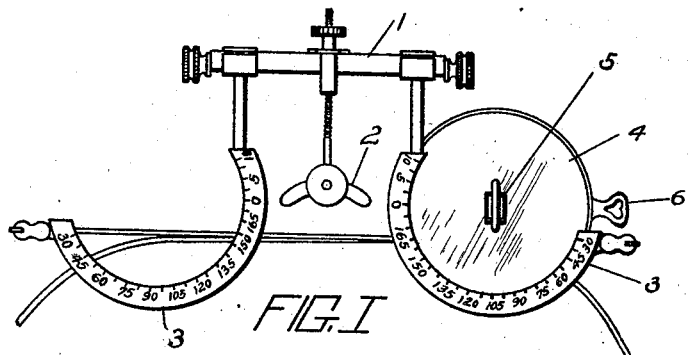
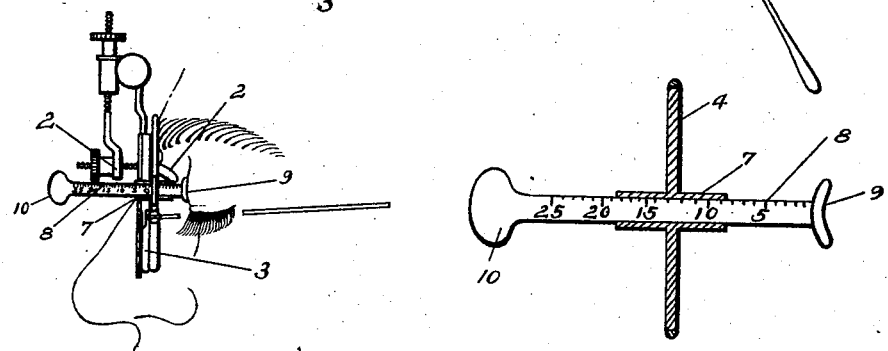
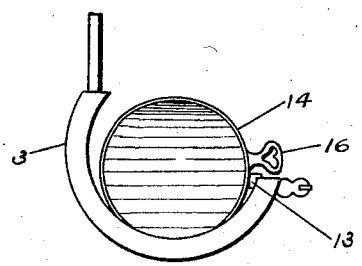
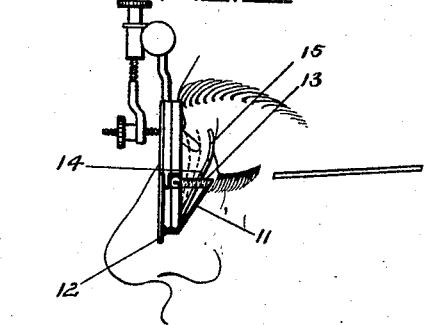
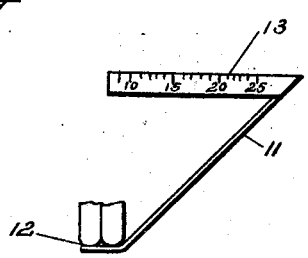
INVENTOR
BERNARD P. CURRIER
BY
*H. H. Styll & A. H. Parsons*
ATTORNEYS Patented Mar. 15, 1927.

1,621,352

UNITED STATES PATENT OFFICE.

BERNARD P. CURRIER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MEASURING INSTRUMENT.

Application filed April 10, 1922. Serial No. 551,134.

This invention relates to new and useful improvements in measuring instruments and more particularly to face measure. It is a well known fact that vertex refraction within a lens produces certain effects at predetermined distances and it is, therefore, one of the main objects of my invention to provide a measuring instrument which can be used in connection with trial frames for measuring the proper distances from the cornea to the plane of the occular surfaces of the lenses used in testing the eye for including this measurement in the prescription as lens powers vary in accordance with the distances from the eye.

Another object of my invention is the provision of a measure of this type which is used by closing the eye and resting a portion of the measure against the outside lid, the thickness of the eye lid being accounted for in the measure, the measuring instrument resting against the closed eye lid whereby the correct distance from the cornea to the lens can be readily ascertained.

A further object of this invention is the provision of a measuring instrument which can be used in connection with various well known types of trial frames and can be quickly and readily mounted upon the trial frame or removed therefrom.

With the above and other objects in view the invention consists in the novel features of construction, the combination and arrangement of parts herein-after more fully set forth, pointed out in the claims and shown in the accompanying drawings.

Figure I represents a front view of a trial frame equipped with one form of my invention.

Figure II represents a side elevation thereof in use.

Figure III represents an enlarged sectional view of the measuring device.

Figure IV represents a fragmentary front view illustrating a modified embodiment of the invention.

Figure V represents a view similar to Fig. II illustrating the use of this form of the invention.

Figure VI represents an enlarged detail view of the measuring scale employed.

Referring more particularly to the drawings the numeral 1 indicates the main bar of a trial frame having the usual movable nose piece 2 and the lens cells 3 supported from the bar 1 and adapted to be positioned in front of the patient's eyes whereby testing lenses may be supported within the cells 3 for testing the eyes of the patient.

Considerable difficulty has been experienced heretofore in obtaining the proper measurement of the distances between the eye and the lenses. With my improved instrument, the proper distances can be readily obtained and included in the prescription so as to produce a lens which will properly fit the vision of the patient's eyes.

My improved instrument which is used in combination with well known types of trial frames includes a disc 4 having a central opening 5 and further provided upon one side thereof with a finger piece 6 whereby the disc 4 may be quickly and readily positioned within the cells 3 or removed therefrom. Connected with the disc 4 and extending from opposite faces thereof are the guide members 7, said guide members being for the purpose of preventing any movement on the part of the graduated scale 8 which is movable thru the opening 5.

The member 8 is provided upon one end with a slightly curved pad member 9 which is adapted to contact with the eye lid of the patient after being closed over the cornea and when the pad member is fitted tightly onto the eye lid the correct distance for the patient is indicated upon the graduated scale upon the inside of the disc. The outer end of the member 8 is provided with a handle member 10 whereby to readily move the member 8 within the opening 5 and correctly fitting the pad 9 upon the eye lid of the patient. It will also be apparent that the guide members 7 will eliminate any unnecessary lateral movement on the part of the member 8 when placed in an operative position.

In Figure V I have illustrated a modified form of the invention wherein an inclined supporting arm 11 is connected at its lower end to the lower edge of one of the lens cells 3, as shown at 12. Upon the upper end of this arm a scaled measure 13 is supported, the measure 13 extending at an angle to the upper end of the arm 11 and adapted to be disposed in a horizontal plane extending inwardly toward the cell supports 3.

For use in connection with this form of the invention I provide a disc 14 having a curved portion 15 formed above the longitudinal center of the disc so that when the disc is resting in the pocket formed by the connection of the arm 11 to the cell 3 the curved portion 15 of the disc will rest against the closed eye lid of the patient. The relative position of the trial frame should be such as to bring the curved portion 15, when the disc is pressed within the pocket of the arm 11, directly in line with the cornea of the eye.

It will be noted that when the disc is arranged within the pocket formed by the connection of the arm 11 to the cell 3 the curve portion 15 will contact with the eye lid and will cross the measure 13 and the scale from the point where the curve portion crosses the scale 13 will indicate the proper distance to be provided for in the prescription as to the required distance between the eye of the patient and the lenses.

In order to facilitate the handling of the disc 14 a finger piece 16 is connected to one side thereof and is preferably disposed at one end of the longitudinal center of the disc so that when the disc is placed in position within the trial frame the finger piece 16 will extend outwardly at the ends of the trial frame, thus bringing the curved portion 15 in its proper relative position to be supported against the eye lids of the patient, and the point where the curved portion 15 crosses the measure 13 will indicate the proper distance the lenses should be supported from the patient's eyes. From the above description taken in connection with the accompanying drawings it will be readily apparent that I have provided a simple and efficient measuring instrument which can be quickly and readily applied to the lens cells of any well known type of trial frame wherein the proper distance between the cornea of the eye and the lenses can be accurately measured and included in the prescription.

What I claim is—

1. The combination with a trial frame and a lens cell of means supported by the cell and adapted to contact with the eye lid of the patient, including additional means co-operating with the first means whereby to indicate the proper distance from the cornea of the patient's eye to the plane of the trial frame lenses used in testing the eye.

2. The combination with a trial frame and a lens cell of a slidably mounted graduated member supported by the lens cell and adapted to contact with the eye lid of the patient for ascertaining the proper distance between the cornea of the patient's eye and the plane of the trial frame lenses used in testing the eyes of the patient.

3. The combination with a trial frame and lens cell of a supporting element carried by the lens cell and means movably mounted within the supporting element and adapted to contact with the eye lid of the patient and co-operating with the support for measuring the proper distance from the cornea of the patient's eye to the plane of the trial frame lenses used in testing the patient's eyes.

4. A measuring instrument for a trial frame and lens cell, comprising a flat member having an opening formed therein and supported by said lens cell, and means reciprocally operable through said opening for measuring the distance from the cornea of the patient's eye to the plane of the lens cell.

5. A measuring instrument for a trial frame and lens cell, comprising a disc member supported by said lens cell and having an opening formed therein, measuring means operable through said opening, a pad carried by one end of said means, and means associated at the opposite end thereof to facilitate manipulation thereof.

6. A measuring instrument for a trial frame, and lens cell comprising a flat disc member having a rectangular opening formed therein and supported by said lens cell, a movable bar having graduations marked thereon, movable through the opening, an arcuate shaped pad carried by one end of the bar and a handle member carried by the opposite end thereof.

7. A measuring instrument for a trial frame and lens cell, comprising a disc having a central opening and supported by said lens cell, guide sleeves arranged on both sides of the opening, a movable indicating bar arranged within said opening and guide sleeves and an arcuate shaped pad carried by one end of said indicating bar and adapted to rest against the eye.

BERNARD P. CURRIER.